Patented Aug. 8, 1939

2,168,571

UNITED STATES PATENT OFFICE 2,168,571

METAL CONTAINING TRISAZO DYES

Hans Krzikalla and Walter Limbacher, Ludwigshafen-on-the-Rhine, Germany, assignors to General Aniline Works, Inc., New York, N. Y., a corporation of Delaware No Drawing. Application July 21, 1937, Serial No. 154,758. In Germany July 31, 1936

7 Claims. (Cl. 260—145)

The present invention relates to azo dyestuffs.
We have found that valuable new azo dyestuffs are obtained by preparing complex metal compounds of water-soluble polyazo dyestuffs of the general formula:

$$A-N=N-A_1-N=N-A_2-N=N-A$$

wherein the A's are radicals of the benzene series at least one of which contains in ortho-position a hydroxyl group, $A_1$ is the radical of a naphthol sulphonic acid, and $A_2$ is an aromatic radical capable of coupling at least twice.

In the preparation of the said polyazo dyestuffs it is preferable to start from a diazotized ortho-aminophenol or a diazotized ortho-aminobenzoic acid, as for example 1-hydroxy-2-amino-4.6-dinitrobenzene, 1-hydroxy-2-aminobenzene-4-sulphonic acid, 1-hydroxy-2-amino-5-nitrobenzene, 1 - hydroxy-2-amino-4-nitrobenzene-6-sulphonic acid, 1-hydroxy-2-amino-4-chlorbenzene-6-sulphonic acid, 1-methyl-3-amino-4-hydroxybenzene-5-sulphonic acids, 5-nitro-2-aminobenzene-1-carboxylic acid or 1-amino-2-naphthol-4-sulphonic acid, the diazo compound being coupled with an aminonaphthol sulphonic acid capable of coupling in ortho-position to the hydroxyl group and capable of still further diazotization, as for example 1.8-aminonaphthol-4- or -5-sulphonic acid, 2.8-aminonaphthol-6-sulphonic acid, 2.5-aminonaphthol-7-sulphonic acid or 1.8-aminonaphthol-3.6- or -4.6-disulphonic acid.

As the component $A_2$ there may be mentioned for example 1.3-dihydroxybenzene, 1.3.5-trihydroxybenzene, 1.3 - diaminobenzene, 1.5 - dihydroxynaphthalene, 1 - hydroxy-3-aminobenzene and their derivatives capable of coupling at least twice.

For adding the other A, there may serve any diazotizable amine, as for example 1-amino-4-nitrobenzene, 1-amino-4-chlorbenzene, 1-aminobenzene-3-sulphonic acid, 3.4-dichlor-1-aminobenzene-6-sulphonic acid, 1-methyl-2-aminobenzene-5-sulphonic acid or 4-nitro-6-chlor-1-hydroxy-2-aminobenzene, as well as 4-aminoazobenzene-4'-sulphonic acid or other aromatic amines already containing an azo bridge. The conversion into the complex metal compounds is effected by treatment of the polyazo dyestuffs free from metal with iron, chromium, nickel, cobalt, copper or other heavy metal compounds.

The metal-containing dyestuffs according to this invention usually yield on leather dyeings which have very good fastness to acids, alkalies, washing and light. Especially valuable nigger-brown shades of color are obtained with the complex iron compounds.

The following examples will further illustrate how the said invention may be carried out in practice but the invention is not restricted to these examples.

Example 1

A solution of 88 parts of the azo dyestuff

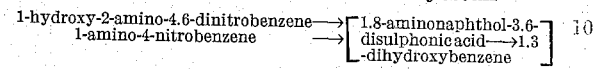

in 1500 parts of water is mixed with 45 parts of sodium acetate and about 16.2 parts of ferric chloride and boiled for some time. The complex iron compound formed is then salted out with common salt, filtered off by suction, washed and dried.

Neutralized chrome leather is dyed in a dyebath with a bath ratio of 1:4 which contains from 1 to 3 per cent of the said complex iron compound for from about 20 to 30 minutes at from 60° to 65° C. After adding about 2 per cent of sulphonated neat's-foot oil, dyeing is continued for a further 30 minutes and the leather is then rinsed and worked up in the usual manner. A leather is obtained which is dyed nigger-brown shades having very good fastness to washing and light. If the chromium, nickel, cobalt or copper compounds of the dyestuff be used instead of the iron compound, valuable brown dyeings are also obtained.

Example 2

A solution of 95.2 parts of the azo dyestuff

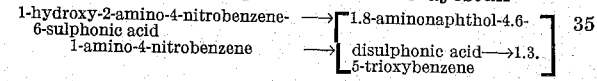

is mixed with 45 parts of crystallized sodium acetate and 17 parts of ferric chloride and boiled for about 1 hour. The complex iron compound is then isolated in the manner described in Example 1.

Glace leather which has been pretreated in the usual manner is dyed for 2 hours at from 40° to 50° C. in a dyebath with a bath ratio of 1:200 with from 1 to 3 per cent of the said complex iron compound. A suspension of egg yolk in water is then added and, after each dyeing period of 30 minutes, acid and 1 per cent of chromium acetate are added. The leather thus dyed is rinsed and further worked up in the usual manner. A beautiful brown dyeing fast to washing is obtained.

The glace leather may also be dyed in the usual manner brushing on with a dyestuff solution.

The following list gives a number of other complex metal azo dyestuffs which may be prepared according to this invention, together with the shade of color obtainable therewith:

| Diazotizable monoazo dyestuff A→A₁ | Middle component A₂ | Other component A | Metal | Shade of color |
|---|---|---|---|---|
| 1-hydroxy-2-amino-4.6-dinitrobenzene→1.8-aminonaphthol-3.6-disulphonic acid. | 1.3-dihydroxybenzene | 4-nitro-1-hydroxy-2-aminobenzene-6-sulphonic acid. | Chromium | Brown. |
| Do | do | do | Iron | Nigger-brown. |
| Do | do | do | Cobalt | Brown. |
| Do | do | do | Nickel | Do. |
| Do | do | do | Copper | Do. |
| Do | do | 2-chlor-1-aminobenzene-5-sulphonic acid. | Iron | Nigger-brown. |
| Do | do | do | Nickel | Brown. |
| Do | do | do | Cobalt | Do. |
| 1-hydroxy-2-amino-4.6-dinitrobenzene→1.8-aminonaphthol-4.6-disulphonic acid. | 1.3.5-trihydroxybenzene | 3.4-dichlor-1-aminobenzene-6-sulphonic acid. | Iron | Nigger-brown. |
| Do | do | do | Cobalt | Brown. |
| Do | do | do | Nickel | Do. |
| Do | do | 4-aminoazo-benzene-4′-sulphonic acid. | Iron | Do. |
| 1-hydroxy-2-amino-4-nitrobenzene-6-sulphonic acid→1.8-aminonaphthol-3.6-disulphonic acid. | 1.3-dihydroxybenzene | 4-chlor-1-aminobenzene | do | Do. |
| Do | do | do | Cobalt | Do. |
| Do | do | do | Nickel | Do. |

What we claim is:
1. A complex metal compound of an azo dyestuff of the general formula

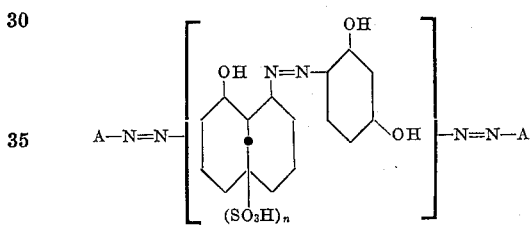

wherein one A is a radical of the benzene series and the other A is the radical

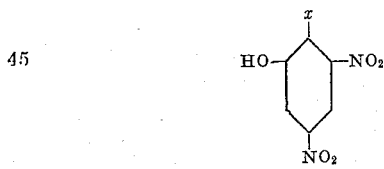

combined with the azo group in the position marked $x$, and $n$ is a whole number from 1 to 2.

2. A complex metal compound of an azo dyestuff of the general formula

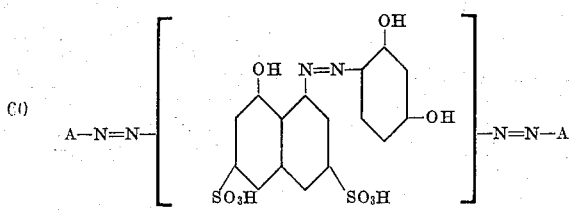

wherein one A is a radical of the benzene series and the other A is the radical

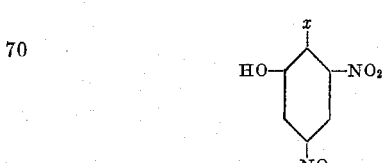

combined with the azo group in the position marked $x$.

3. A complex metal compound of an azo dyestuff of the general formula

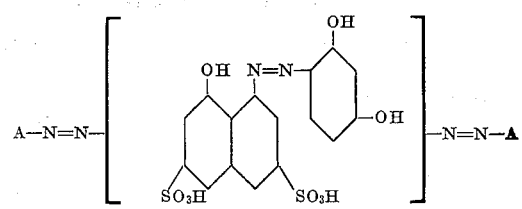

wherein one A is a nitrophenyl radical and the other A the radical

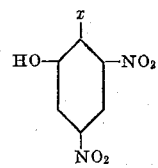

combined with the azo group in the position marked $x$.

4. A complex metal compound of the azo dyestuff having the formula

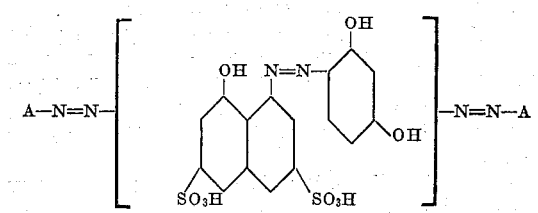

wherein one A is a para-nitrophenyl radical and the other A the radical

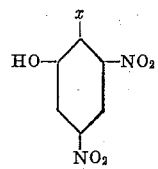

combined with the azo group in the position marked $x$.

5. The complex iron compound of the azo dyestuff having the formula

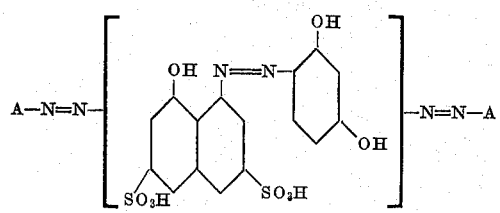

wherein one A is a para-nitrophenyl radical and the other A the radical

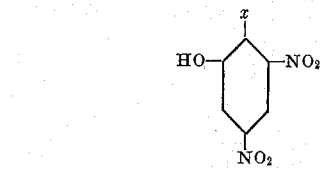

combined with the azo group in the position marked $x$.

6. The complex copper compound of the azo dyestuff having the formula

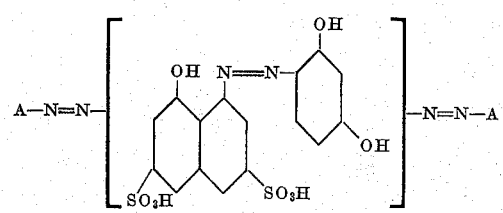

wherein one A is a para-nitrophenyl radical and the other A the radical.

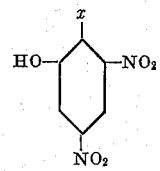

combined with the azo group in the position marked $x$.

7. The complex chromium compound of the azo dyestuff having the formula

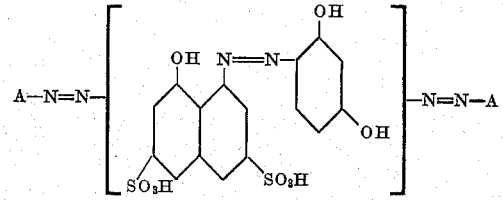

wherein one A is a para-nitrophenyl radical and the other A the radical

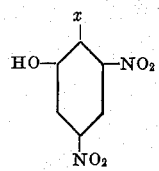

combined with the azo group in the position marked $x$.

HANS KRZIKALLA.
WALTER LIMBACHER.